US011996076B2

(12) United States Patent
Kotegawa

(10) Patent No.: US 11,996,076 B2
(45) Date of Patent: May 28, 2024

(54) ACTIVE NOISE REDUCTION DEVICE, VEHICLE, AND ANOMALY DETERMINATION METHOD

(71) Applicant: Panasonic Intellectual Property Management Co., Ltd., Osaka (JP)

(72) Inventor: Kazuhisa Kotegawa, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 99 days.

(21) Appl. No.: 17/752,356

(22) Filed: May 24, 2022

(65) Prior Publication Data

US 2022/0284879 A1 Sep. 8, 2022

Related U.S. Application Data

(63) Continuation of application No. PCT/JP2020/043152, filed on Nov. 19, 2020.

(30) Foreign Application Priority Data

Nov. 29, 2019 (JP) ................................ 2019-217059

(51) Int. Cl.

*G10K 11/178* (2006.01)
*H04R 3/00* (2006.01)
*H04R 29/00* (2006.01)

(52) U.S. Cl.

CPC .. *G10K 11/17823* (2018.01); *G10K 11/17817* (2018.01); *G10K 11/17835* (2018.01); *G10K 11/17854* (2018.01); *H04R 3/00* (2013.01); *H04R 29/00* (2013.01); *G10K 2210/1282* (2013.01); *G10K 2210/12821* (2013.01); *G10K 2210/501* (2013.01); *H04R 2499/13* (2013.01)

(58) Field of Classification Search

CPC ..... G10K 11/17835; G10K 2210/1282; G10K 2210/12821; G10K 2210/501; H04R 29/00

See application file for complete search history.

(56) References Cited

U.S. PATENT DOCUMENTS 11,790,883 B2 * 10/2023 Kotegawa ........ G10K 11/17825 381/71.4
2018/0211647 A1 * 7/2018 Tani ................ G10K 11/17833

FOREIGN PATENT DOCUMENTS

JP 2009-241672 A 10/2009
JP 2019-082628 A 5/2019

OTHER PUBLICATIONS

Machine translation of JP 2009-241672, 12 pgs. (Year: 2009).*

(Continued)

*Primary Examiner* — Ping Lee

(74) *Attorney, Agent, or Firm* — Greenblum & Bernstein, P.L.C.

(57) ABSTRACT

An active noise reduction device includes: a reference signal input terminal that receives a reference signal outputted by a reference signal source and having a correlation with noise in a space in an automobile, the reference signal source being attached to the automobile; a test signal source that outputs a test signal to a loudspeaker attached to the automobile, the loudspeaker being used to output a canceling sound for reducing the noise; and an anomaly determiner that determines whether the reference signal source has an anomaly, based on the reference signal inputted from the reference signal source to the reference signal input terminal when the test signal is outputted to the loudspeaker.

20 Claims, 8 Drawing Sheets

(56) References Cited

OTHER PUBLICATIONS

International Search Report (including English Language Translation), mailed Feb. 22, 2021, by the Japan Patent Office (JPO), in International Application No. PCT/JP2020/043152.
Office Action from Japan Patent Office (JPO) in Japanese Patent Appl. No. 2019-217059, dated Oct. 3, 2023, together with an English language translation.
Office Action from Japan Patent Office (JPO) in Japanese Patent Appl. No. 2019-217059, dated Feb. 20, 2024, together with an English language translation. 4 pages.

* cited by examiner

ACTIVE NOISE REDUCTION DEVICE, VEHICLE, AND ANOMALY DETERMINATION METHOD

CROSS REFERENCE TO RELATED APPLICATIONS

This is a continuation application of PCT International Application No. PCT/JP2020/043152 filed on Nov. 19, 2020, designating the United States of America, which is based on and claims priority of Japanese Patent Application No. 2019-217059 filed on Nov. 29, 2019.

FIELD

The present disclosure relates to an active noise reduction device that actively reduces noise by interfering a canceling sound with the noise, a vehicle including the active noise reduction device, and an anomaly determination method.

BACKGROUND

Conventionally, an active noise reduction device has been known that actively reduces noise by outputting a canceling sound for canceling out the noise from a canceling sound source using a reference signal having a correlation with the noise and an error signal that is based on a residual sound generated through interference between the noise and the canceling sound in a predetermined space (see Patent Literature (PTL) 1, for example). The active noise reduction device updates an adaptive filter based on a coefficient updating algorithm and convolves the reference signal with the adaptive filter to generate a canceling signal for outputting a canceling sound. The active noise reduction device uses an adaptive filter to generate a canceling signal for outputting a canceling sound.

CITATION LIST

Patent Literature

PTL 1: Japanese Unexamined Patent Application Publication No. 2019-82628.

SUMMARY

The present disclosure provides an active noise reduction device capable of improving upon the above related art.

An active noise reduction device according to one aspect of the present disclosure includes: a reference signal input that receives a reference signal outputted by a reference signal source and having a correlation with noise in a space in a vehicle, the reference signal source being attached to the vehicle; a test signal source that outputs a test signal to a loudspeaker attached to the vehicle, the loudspeaker being used to output a canceling sound for reducing the noise; and an anomaly determiner that determines whether the reference signal source has an anomaly, based on the reference signal inputted from the reference signal source to the reference signal input when the test signal is outputted to the loudspeaker.

An active noise reduction device according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Hereinafter, an embodiment will be specifically described with reference to the drawings. Note that the embodiment described below shows a general or specific example. The numerical values, shapes, materials, structural elements, the arrangement and connection of the structural elements, steps, the order of the steps, etc. mentioned in the following embodiment are mere examples and not intended to limit the present disclosure. Of the structural elements in the following embodiment, structural elements not recited in any one of the independent claims are described as optional structural elements.

Each diagram is a schematic diagram, and not necessarily a precise illustration. Note that throughout the figures, structural elements that are essentially the same share like reference signs, and duplicate description is omitted or simplified.

Embodiment

Configuration of Automobile Including Active Noise Reduction Device

Figure 1:
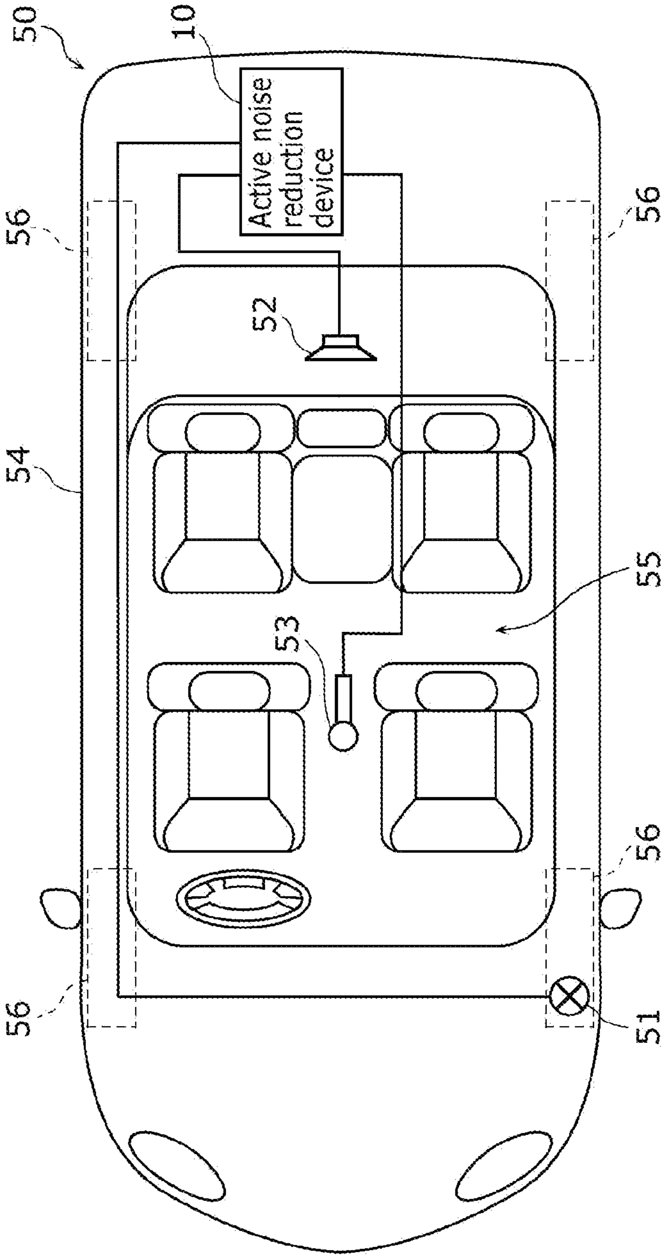
FIG. 1 is a schematic diagram of an automobile including an active noise reduction device according to an embodiment as viewed from above.

An embodiment describes an active noise reduction device mounded on an automobile. FIG. 1 is a schematic diagram of an automobile including an active noise reduction device according to the embodiment as viewed from above.

Automobile 50 is an example of a vehicle. Automobile 50 includes active noise reduction device 10 according to the embodiment, reference signal source 51, loudspeaker 52, error signal source 53, automobile main body 54, and four wheels 56. Automobile 50 is specifically a passenger car, but is not particularly limited to a passenger car.

Reference signal source 51 is a transducer that outputs a reference signal having a correlation with noise in space 55 in the passenger compartment of automobile 50. Here, noise also includes vibration. In the embodiment, reference signal source 51 is an acceleration sensor and is disposed outside space 55. Specifically, reference signal source 51 is attached to the subframe near the left front wheel, but may be attached to a wheel housing or knuckle, for example. Reference signal source 51 may be attached to any position. Moreover, reference signal source 51 may be a microphone. Reference signal source 51 may be a sensor or the like whose output changes due to vibration transferred to reference signal source 51. Note that noise that is mainly targeted by active noise reduction device 10 is road noise, for example. Because of complexity of the propagation path of load noise, a configuration is useful in which an acceleration sensor is used as reference signal source 51.

Loudspeaker 52 outputs a canceling sound to space 55 using a canceling signal. Moreover, loudspeaker 52 outputs a test sound to space 55 using a test signal, which will be described later. A plurality of loudspeakers 52 may be used in active noise reduction device 10, and loudspeakers 52 may be attached to any position.

Error signal source 53 detects a residual sound produced by interference between noise and a canceling sound in space 55 and outputs an error signal based on the residual sound. Error signal source 53 is a transducer, such as a microphone, and is desirable to be disposed in space 55, for example, on a headliner. Note that automobile 50 may include a plurality of error signal sources 53.

Automobile main body 54 is a structure including a chassis, a body, and the like of automobile 50. Automobile main body 54 forms space 55 (the space in the automobile cabin) in which loudspeaker 52 and error signal source 53 are disposed.

Configuration of Active Noise Reduction Device

Figure 2:
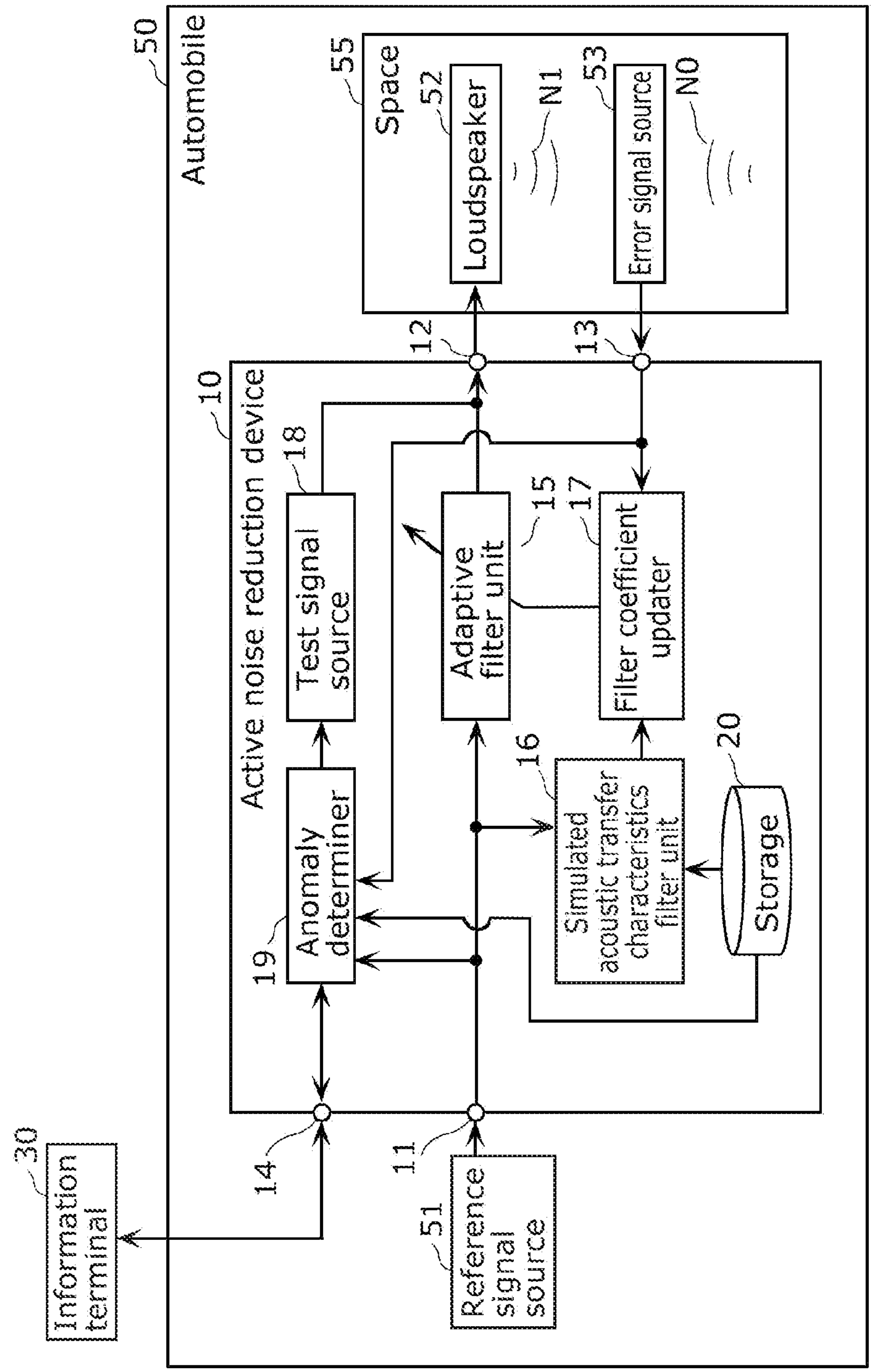
FIG. 2 is a block diagram illustrating a functional configuration of the active noise reduction device according to the embodiment.

Next, a configuration of active noise reduction device 10 will be described. FIG. 2 is a block diagram illustrating a functional configuration of active noise reduction device 10. Note that in FIG. 2, information terminal 30 is also illustrated in addition to automobile 50. Information terminal 30 is a terminal that is connected to extension terminal 14 when anomaly determination operation, which will be described below, is performed. Specifically, information terminal 30 is a laptop or a tablet device, for example.

Active noise reduction device 10 includes: reference signal input terminal 11; canceling signal output terminal 12; error signal input terminal 13; extension terminal 14; adaptive filter unit 15; simulated acoustic transfer characteristics filter unit 16; filter coefficient updater 17; test signal source 18; anomaly determiner 19; and storage 20.

Reference signal input terminal 11, canceling signal output terminal 12, error signal input terminal 13, and extension terminal 14 are each a terminal made of metal, for example.

Adaptive filter unit 15, simulated acoustic transfer characteristics filter unit 16, filter coefficient updater 17, test signal source 18, and anomaly determiner 19 (hereinafter also referred to as adaptive filter unit 15, etc.) may be implemented, for example, by executing software by a processor, such as a digital signal processor (DSP), or a microcomputer.

Adaptive filter unit 15, etc. may be implemented by hardware, such as circuitry. Moreover, part of adaptive filter unit 15, etc. may be implemented by software and the remaining part may be implemented by hardware.

Storage 20 is a storage device that stores simulated acoustic transfer characteristics, etc. Specifically, storage 20 is implemented by semiconductor memory, for example. Note that when adaptive filter unit 15, etc. are implemented by a processor, such as a DSP, a control program to be executed by the processor is also stored in storage 20. Storage 20 may also store other parameters to be used for signal processing performed by adaptive filter unit 15, etc.

Basic Operation

Figure 3:
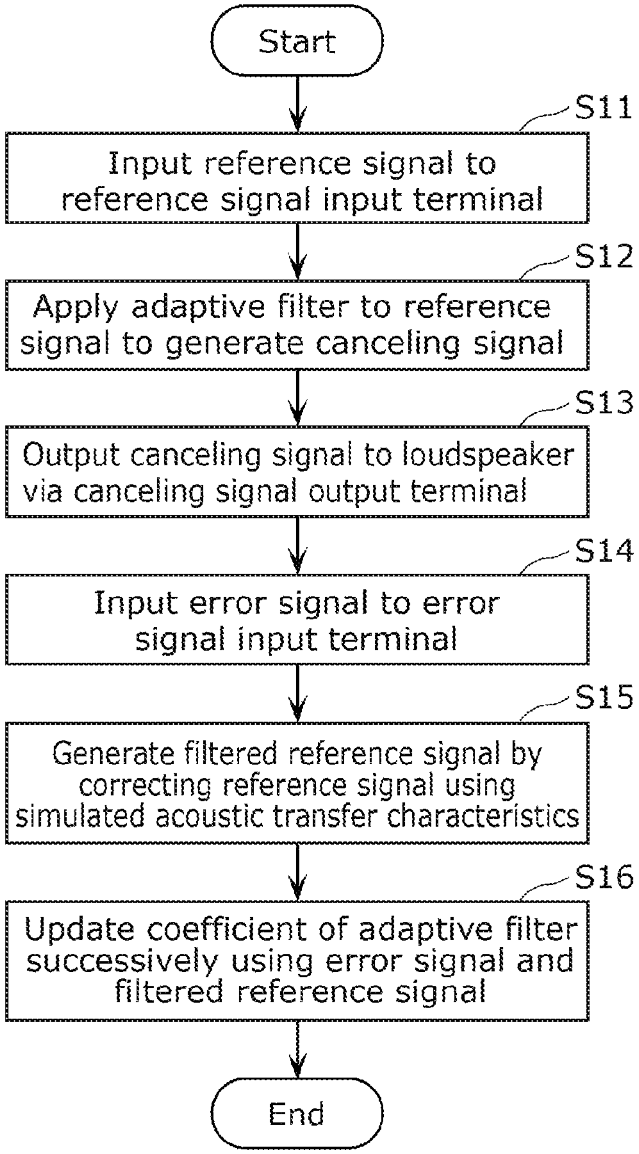
FIG. 3 is a flowchart of a basic operation of the active noise reduction device according to the embodiment.

As described above, active noise reduction device 10 performs noise reduction operation. First, a basic operation of active noise reduction device 10 will be described with reference to FIG. 3 in addition to FIG. 2. FIG. 3 is a flowchart of the basic operation of active noise reduction device 10.

First, a reference signal having a correlation with noise N0 is inputted from reference signal source 51 to reference signal input terminal 11 (S11).

Next, adaptive filter unit 15 convolves an adaptive filter with the reference signal inputted to reference signal input terminal 11 to generate a canceling signal to be used to output canceling sound N1 for reducing noise N0 (S12). Adaptive filter unit 15 is implemented by what is called a finite impulse response (FIR) filter or an infinite impulse response (IIR) filter. Adaptive filter unit 15 outputs the generated canceling signal to loudspeaker 52 via canceling signal output terminal 12 (S13). Loudspeaker 52 outputs canceling sound N1 based on the canceling signal.

Error signal source 53 detects a residual sound resulting from interference between canceling sound N1 and noise N0 emitted from loudspeaker 52 corresponding to the canceling signal and outputs an error signal based on the residual sound. As a result, the error signal is inputted to error signal input terminal 13 (S14).

Simulated acoustic transfer characteristics filter unit 16 generates a filtered reference signal by correcting the reference signal inputted to reference signal input terminal 11, using simulated acoustic transfer characteristics (S15). The simulated acoustic transfer characteristics simulate acoustic transfer characteristics from the position of loudspeaker 52 to the position of error signal source 53. For example, the simulated acoustic characteristics are measured in space 55 and stored in storage 20 in advance. Simulated acoustic transfer characteristics filter unit 16 reads and uses the simulated acoustic transfer characteristics stored in storage 20.

Filter coefficient updater 17 sequentially updates coefficient W of the adaptive filter using the error signal inputted to the error signal input terminal and the generated filtered reference signal (S16).

Specifically, filter coefficient updater 17 uses a least mean square (LMS) method to calculate coefficient W of the adaptive filter to minimize the sum of squares of the error signal, and outputs the calculated coefficient of the adaptive filter to adaptive filter unit 15. Moreover, filter coefficient updater 17 sequentially updates the coefficient of the adaptive filter. Coefficient W of the adaptive filter is expressed as Expression 1 below, where “e” denotes a vector of the error signal and “R” denotes a vector of the filtered reference signal. Note that n is a natural number and represents an n-th sample in sampling period Ts. Here, $\mu$ is a scalar quantity and is a step size parameter that determines an amount of updating coefficient W of the adaptive filter per sampling.

[Math. 1]

$$W(n+1)=W(n)-\mu\cdot e(n)\cdot R(n) \quad \text{(Expression 1)}$$

Note that filter coefficient updater 17 may update coefficient W of the adaptive filter with a method other than the LMS method.

Example 1 of Anomaly Determination Operation

Next, anomaly determination operation of active noise reduction device 10 will be described. If reference signal source 51 does not output an appropriate reference signal, active noise reduction device 10 may not be able to reduce noise N0 sufficiently. In other words, an anomaly of reference signal source 51 may be a cause of not being able to reduce noise N0 sufficiently.

Here, PTL 1 discloses a technique for determining an anomaly of an acceleration sensor by detecting a DC offset level of an output signal of the acceleration sensor. However, in such a technique, although an electrical problem in the acceleration sensor can be found, problems not caused by the electric circuit, such as poor attachment of the acceleration sensor, cannot be found.

Figure 4:
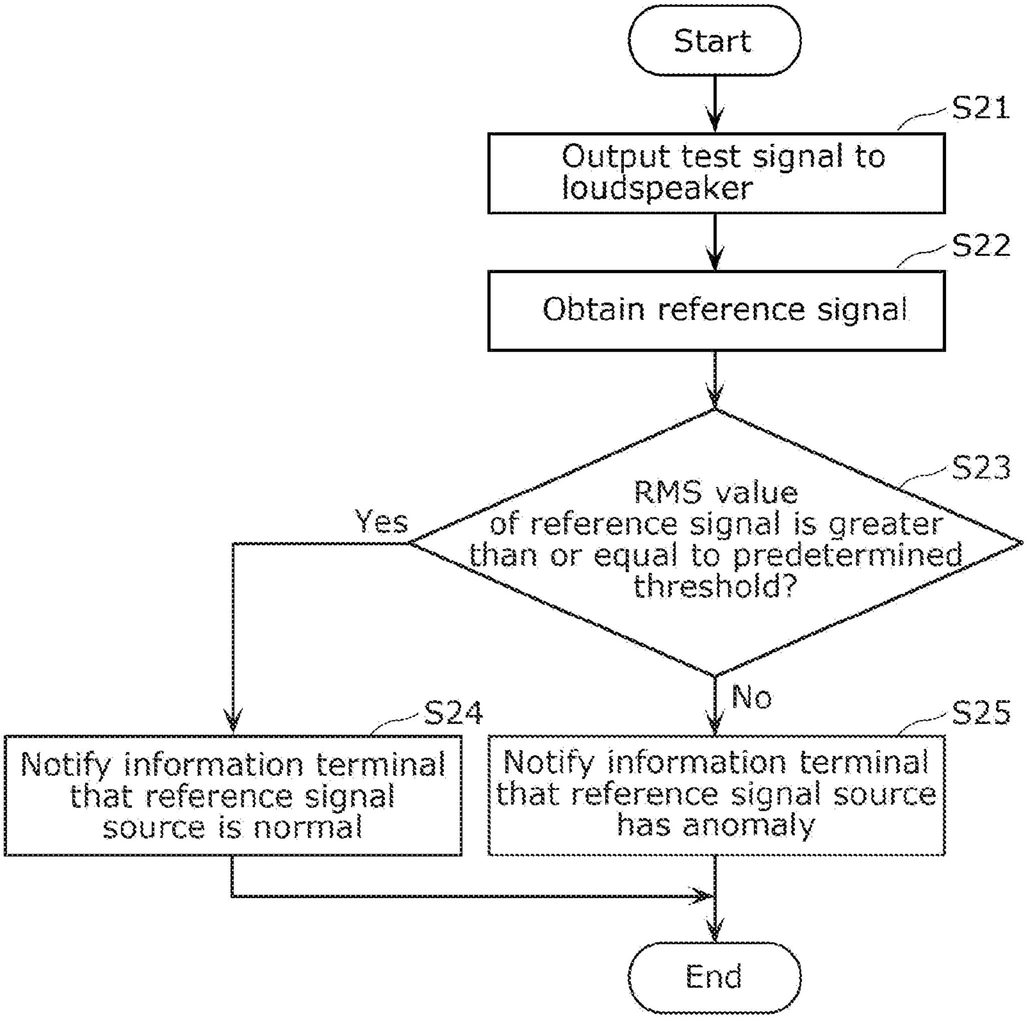
FIG. 4 is a flowchart of example 1 of an anomaly determination operation of an anomaly determiner.

In contrast, if there is a problem in the attachment of reference signal source 51 to automobile main body 54, anomaly determiner 19 of active noise reduction device 10 can determine whether there is a problem (whether there is an anomaly) using the test signal outputted from test signal source 18. FIG. 4 is a flowchart of example 1 of the anomaly determination operation of anomaly determiner 19.

Note that the anomaly determination operation illustrated in FIG. 4 is assumed to be performed by an operator, for example, when automobile 50 is shipped from a factory or automobile 50 is inspected at a store (dealer) or the like of automobile 50. When the anomaly determination operation is performed, automobile 50 is stationary (not moving) and information terminal 30 is connected to extension terminal 14 of active noise reduction device 10 via a cable, for example.

When the operator performs a predetermined operation on information terminal 30 (or a user interface device included in active noise reduction device 10, which is not illustrated), anomaly determiner 19 causes test signal source 18 to output a test signal (S21). The test signal is outputted to loudspeaker 52 via canceling signal output terminal 12. For example, test signal source 18 outputs a sine wave as a test signal. The frequency of a sine wave is, for example, a specific frequency from 30 Hz to 300 Hz. The frequency of a sine wave is a frequency belonging to a frequency band of noise N0 that is mainly targeted by active noise reduction device 10, for example. Note that the test signal may be any signal as long as the test signal can vibrate loudspeaker 52, and does not need to be a sine wave.

Loudspeaker 52 that has obtained the test signal outputs a test sound. At this time, loudspeaker 52 vibrates and this vibration should be transferred to reference signal source 51. In other words, while the test sound is outputted from loudspeaker 52, reference signal source 51 should output a reference signal in response to speaker 52 outputting the test sound. However, if reference signal source 51 is not properly attached to automobile main body 54 (for example, not securely fastened), the vibration is not properly transferred to reference signal source 51 and therefore the level of the reference signal outputted from reference signal source 51 is considered to be lower than expected.

In view of the above, anomaly determiner 19 obtains the reference signal inputted from reference signal source 51 to reference signal input terminal 11 during the period in which the test signal is outputted from test signal source 18 to loudspeaker 52 (S22). In addition, anomaly determiner 19 calculates the root mean square (RMS) value of the signal level of the obtained reference signal in a predetermined period (for example, approximately a few seconds), and determines whether the calculated RMS value is greater than or equal to the predetermined threshold (S23). In other words, anomaly determiner 19 compares the signal level of the reference signal with a predetermined threshold. The predetermined threshold is determined experimentally or empirically and is stored in storage 20 in advance. Anomaly determiner 19 reads and uses the predetermined threshold stored in storage 20.

Figure 5:
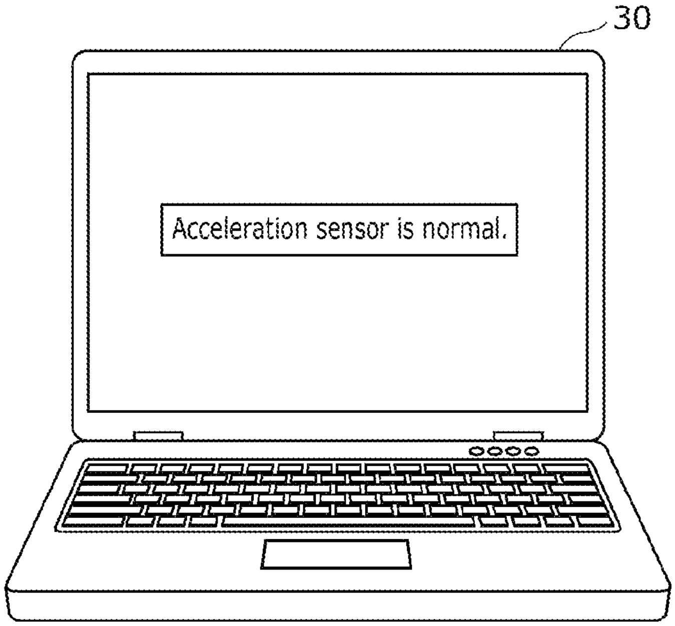
FIG. 5 is a diagram illustrating an example of an image showing that a reference signal source is normal.

When anomaly determiner 19 determines that the RMS value is greater than or equal to the predetermined threshold (Yes in S23), anomaly determiner 19 notifies information terminal 30 that reference signal source 51 is normal (S24). As a result, an image showing that reference signal source 51 is normal is shown on the display of information terminal 30. FIG. 5 is a diagram illustrating an example of an image showing that reference signal source 51 is normal.

Figure 6:
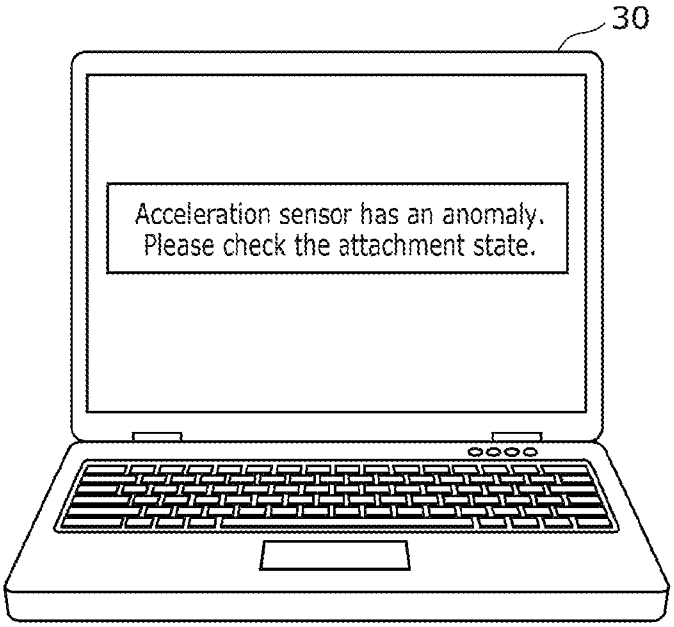
FIG. 6 is a diagram illustrating an example of an image showing that a reference signal source has an anomaly.

In contrast, when anomaly determiner 19 determines that the RMS value is less than the predetermined threshold (No in S23), anomaly determiner 19 notifies information terminal 30 that reference signal source 51 has an anomaly (S25). As a result, an image showing that reference signal source 51 has an anomaly is shown on the display of information terminal 30. FIG. 6 is a diagram illustrating an example of an image showing that reference signal source 51 has an anomaly.

As described above, active noise reduction device 10 can determine whether reference signal source 51 has an anomaly using vibration of loudspeaker 52, which emits a test sound.

Note that it is not necessary to calculate the RMS value in example 1 of the anomaly determination operation. For example, a time average value of the signal levels of the reference signal may be calculated instead of the RMS value. Moreover, in example 1 of the anomaly determination operation, the predetermined threshold is a lower limit of a range in which the RMS value is normal. However, instead of the lower limit, an upper limit of the range in which the RMS value is normal may be used as the predetermined threshold. In this case, when the RMS value is greater than the upper limit, reference signal source 51 is determined to have an anomaly.

Moreover, in addition to the lower limit, the upper limit may also be used as the predetermined threshold. In this case, reference signal source 51 is determined to have an anomaly in both cases where the RMS value is less than the lower limit and where the RMS value is greater than the upper limit.

Example 2 of Anomaly Determination Operation

Figure 7:
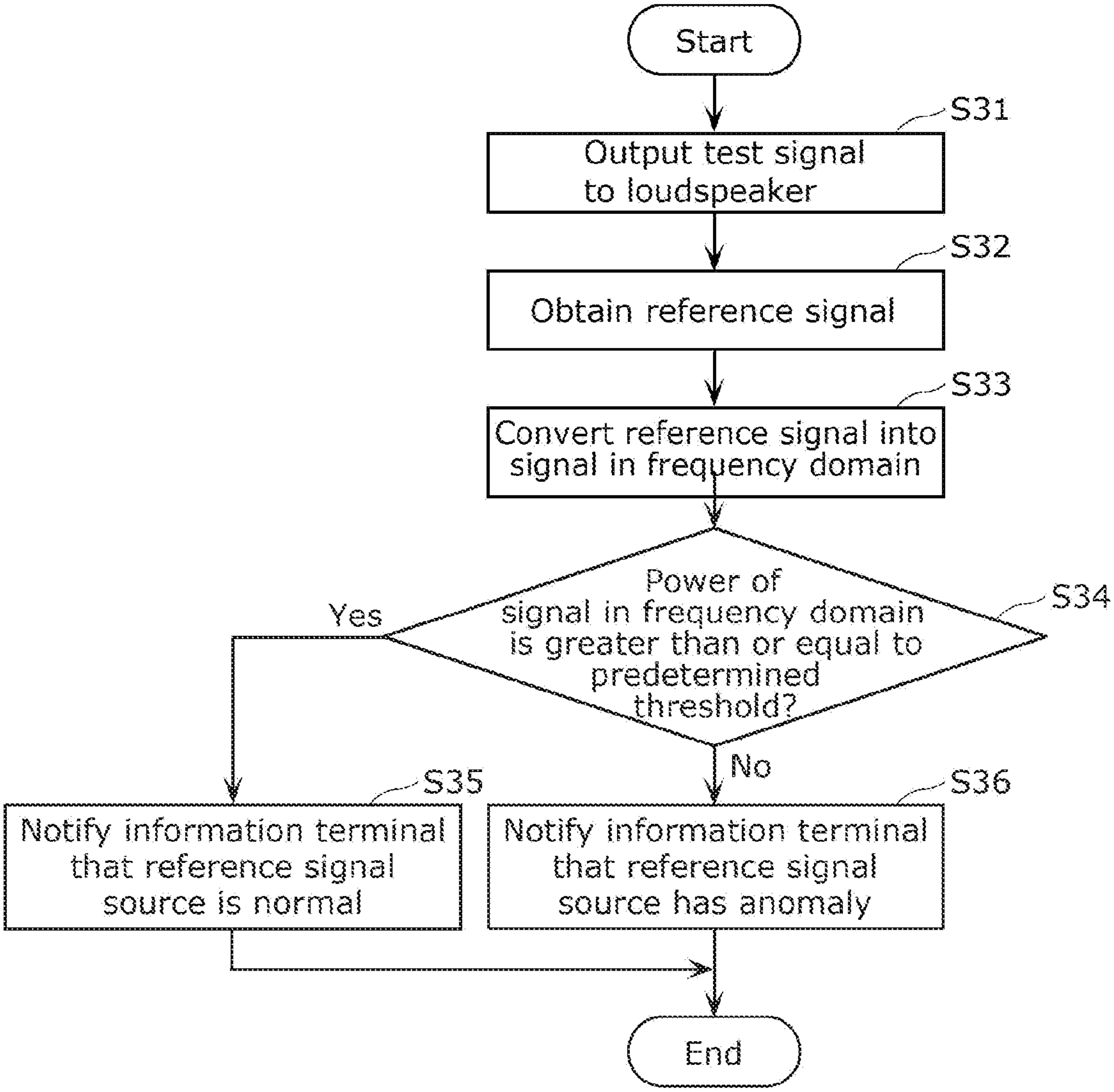
FIG. 7 is a flowchart of example 2 of the anomaly determination operation of the anomaly determiner.

Anomaly determiner 19 may convert the reference signal into a signal in a frequency domain to determine whether reference signal source 51 has an anomaly. Hereinafter, example 2 of an anomaly determination operation of such anomaly determiner 19 will be described. FIG. 7 is a flowchart of example 2 of the anomaly determination operation of anomaly determiner 19. Note that the matters described in example 1 of the anomaly determination operation will be omitted as appropriate.

When the operator performs a predetermined operation on information terminal 30 (or a user interface device included in active noise reduction device 10, which is not illustrated), anomaly determiner 19 causes test signal source 18 to output a test signal (S31). As describe above, the test signal is a sine wave having a specific frequency from 30 Hz to 300 Hz, for example.

Anomaly determiner 19 obtains a reference signal inputted from reference signal source 51 to reference signal input terminal 11 during a period in which the test signal is outputted from test signal source 18 to loudspeaker 52 (S32). In addition, anomaly determiner 19 converts the obtained reference signal into a signal in a frequency domain (power spectrum) (S33) and determines whether the power of the signal in the frequency domain at the specific frequency is greater than or equal to a predetermined threshold (S34). In other words, anomaly determiner 19 compares the power of the signal in the frequency domain with the predetermined threshold. The predetermined threshold is determined experimentally or empirically and is stored in storage 20 in advance.

When anomaly determiner 19 determines that the power of the signal in the frequency domain at the specific frequency is greater than or equal to the predetermined threshold (Yes in S34), anomaly determiner 19 notifies information terminal 30 that reference signal source 51 is normal (S35). As a result, an image showing that reference signal source 51 is normal is shown on the display of information terminal 30, as in FIG. 5 described above.

In contrast, when anomaly determiner 19 determines that the power of the signal in the frequency domain at the specific frequency is less than the predetermined threshold (No in S34), anomaly determiner 19 notifies information terminal 30 that reference signal source 51 has an anomaly (S36). As a result, an image showing that reference signal source 51 has an anomaly is shown on the display of information terminal 30, as in FIG. 6 described above.

As described above, active noise reduction device 10 can convert the reference signal into a signal in a frequency domain and determine whether reference signal source 51 has an anomaly based on the signal in the frequency domain.

Note that in step S34, anomaly determiner 19 may calculate a time average of the power at the specific frequency, or may calculate an RMS value of the power at the specific frequency in a predetermined period (approximately a few seconds) and compare the RMS value with the predetermined threshold.

Moreover, in example 2 of the anomaly determination operation, the predetermined threshold is a lower limit of a range in which the power of the signal in the frequency domain is normal. However, instead of the lower limit, an upper limit of the range in which the power of the signal in the frequency domain is normal may be used as the predetermined threshold. In this case, when the power of the signal in the frequency domain is greater than the upper limit, reference signal source 51 is determined to have an anomaly.

Moreover, in addition to the lower limit, the upper limit may also be used as the predetermined threshold. In this case, reference signal source 51 is determined to have an anomaly in both cases where the power of the signal in the frequency domain is less than the lower limit and where the power of the signal in the frequency domain is greater than the upper limit.

Example 3 of Anomaly Determination Operation

Figure 8:
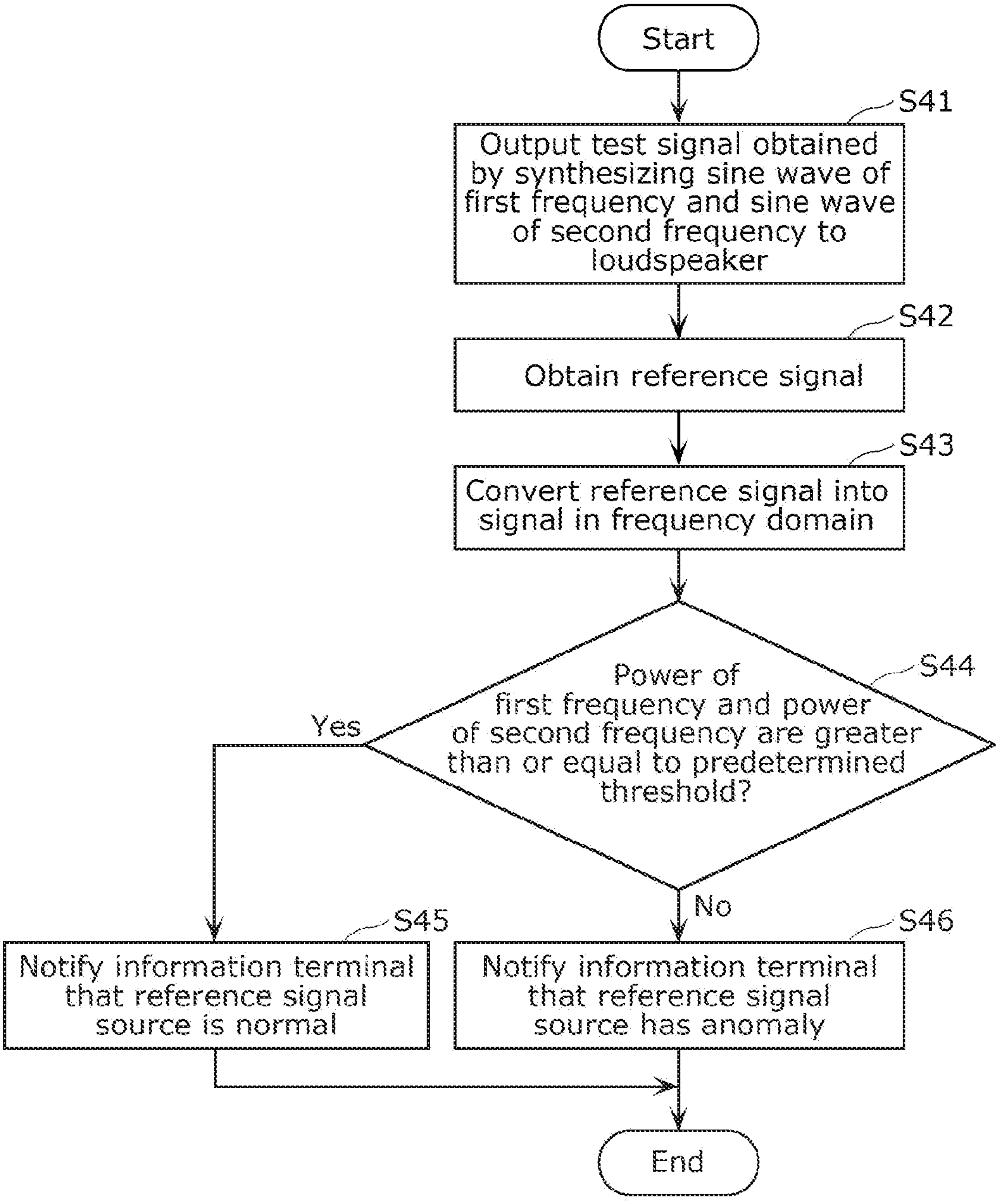
FIG. 8 is a flowchart of example 3 of the anomaly determination operation of the anomaly determiner.

In example 2 of the anomaly determination operation, a signal obtained by synthesizing a plurality of sine waves having mutually different frequencies may be used as the test signal. In other words, in step S21, test signal source 18 may output, to loudspeaker 52, a signal obtained by synthesizing a plurality of sine waves having mutually different frequencies. Hereinafter, example 3 of an anomaly determination operation of such anomaly determiner 19 will be described. FIG. 8 is a flowchart of example 3 of the anomaly determination operation of anomaly determiner 19. Note that the matters described in example 1 and example 2 of the anomaly determination operation will be omitted as appropriate.

When the operator performs a predetermined operation on information terminal 30 (or a user interface device included in active noise reduction device 10, which is not illustrated), anomaly determiner 19 causes test signal source 18 to output a test signal (S41). The test signal is, for example, a signal obtained by synthesizing a sine wave of a first frequency and a sine wave of a second frequency different from the first frequency. The first frequency and the second frequency are each a frequency belonging to a frequency band (from 30 Hz to 300 Hz) of noise N0 that is mainly targeted by active noise reduction device 10, for example. The test signal may be a signal obtained by synthesizing three or more sine waves having mutually different frequencies.

Anomaly determiner 19 obtains the reference signal inputted from reference signal source 51 to reference signal input terminal 11 during a period in which the test signal is outputted from test signal source 18 to loudspeaker 52 (S42). In addition, anomaly determiner 19 converts the obtained reference signal into a signal in a frequency domain (power spectrum) (S43) and determines whether the power of the signal in the frequency domain at the first frequency and the power of the signal in the frequency domain at the second frequency are each greater than or equal to the predetermined threshold (S44). The predetermined threshold is determined experimentally or empirically and is stored in storage 20 in advance. The predetermined threshold for the first frequency may be the same as or different from the predetermined threshold for the second frequency.

When anomaly determiner 19 determines that each of the power at the first frequency and the power at the second frequency is greater than or equal to the predetermined threshold (Yes in S44), anomaly determiner 19 notifies information terminal 30 that reference signal source 51 is normal (S45). As a result, an image showing that reference signal source 51 is normal is shown on the display of information terminal 30, as in FIG. 5 described above.

In contrast, when anomaly determiner 19 determines that at least one of the power at the first frequency or the power at the second frequency is less than the predetermined threshold (No in S44), anomaly determiner 19 notifies information terminal 30 that reference signal source 51 has an anomaly (S46). As a result, an image showing that reference signal source 51 has an anomaly is shown on the display of information terminal 30, as in FIG. 6 described above.

As described above, active noise reduction device 10 compares each of the frequency components of the reference signal with the predetermined threshold using the test signal obtained by synthesizing a plurality of sine waves having mutually different frequencies. With this, active noise reduction device 10 can determine whether reference signal source 51 has an anomaly with high accuracy.

Note that in step S44, anomaly determiner 19 may calculate a time average of the power at the first frequency (second frequency) or an RMS value of the power of the first frequency (second frequency) in a predetermined period (approximately a few seconds), and compare the calculated value with the predetermined threshold. Moreover, in example 3 of the anomaly determination operation, the predetermined threshold is a lower limit of the range in which the power of the signal in the frequency domain is normal. However, in addition to the lower limit, an upper limit of the range in which the power of the signal in the frequency domain is normal may also be used as the predetermined threshold.

Moreover, in example 3 of the anomaly determination operation, an example of the anomaly determination operation using a test signal obtained by synthesizing a plurality of sine waves in example 2 of the anomaly determination operation is described. However, a test signal obtained by synthesizing a plurality of sine waves may be used in example 1 of the anomaly determination operation. In this case, anomaly determiner 19 may filter the obtained reference signal to separate the reference signal into a plurality of signals having mutually different frequencies, and determine whether each of the signals satisfies the signal level requirement.

Example 4 of Anomaly Determination Operation

Figure 9:
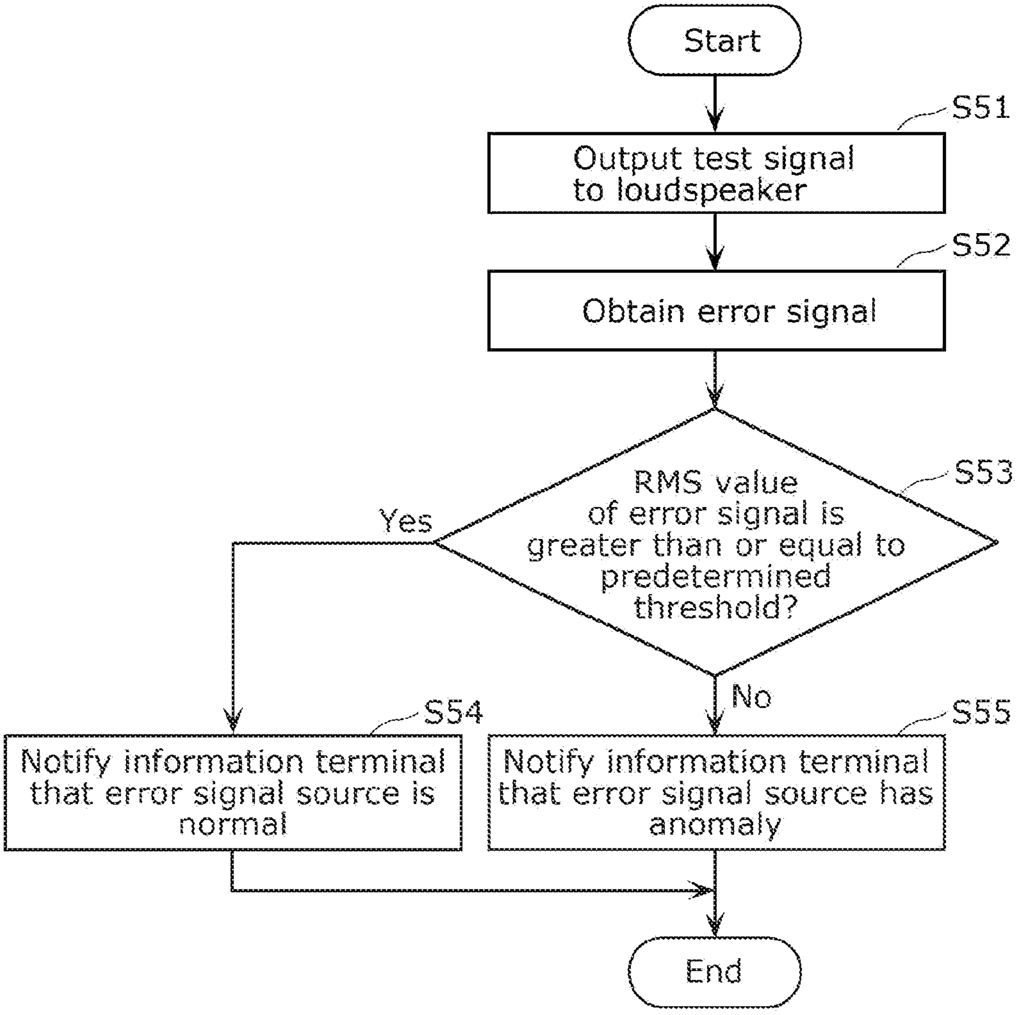
FIG. 9 is a flowchart of example 4 of the anomaly determination operation of the anomaly determiner.

When an anomaly in reference signal source 51 is determined, a test sound is outputted from loudspeaker 52. Anomaly determiner 19 may use the test sound to determine whether error signal source 53 has an anomaly in addition to reference signal source 51. Hereinafter, example 4 of an anomaly determination operation of such anomaly determiner 19 will be described. FIG. 9 is a flowchart of example 4 of the anomaly determination operation of anomaly determiner 19. Note that example 4 of the anomaly determination operation is performed in parallel with one of example 1 to example 3 of the anomaly determination operation.

When the operator performs a predetermined operation on information terminal 30 (or a user interface device included in active noise reduction device 10, which is not illustrated), anomaly deter liner 19 causes test signal source 18 to output a test signal (S51).

In view of the above, anomaly determiner 19 obtains an error signal inputted from error signal source 53 to error signal input terminal 13 during a period in which the test signal is outputted from test signal source 18 to loudspeaker 52 (S52). In addition, anomaly determiner 19 calculates the root mean square (RMS) value of the signal level of the obtained error signal in a predetermined period (for example, approximately a few seconds), and determines whether the calculated RMS value is greater than or equal to the predetermined threshold (S53). In other words, anomaly determiner 19 compares the signal level of the error signal with a predetermined threshold. The predetermined threshold is determined experimentally or empirically and is stored in storage 20 in advance.

When the RMS value is greater than or equal to the predetermined threshold, error signal source 53 is considered to properly detect the test sound outputted from loudspeaker 52. Therefore, when anomaly determiner 19 determines that the RMS value is greater than or equal to the predetermined threshold (Yes in S53), anomaly determiner 19 notifies information terminal 30 that error signal source 53 is normal (S54). As a result, an image showing that error signal source 53 is normal is shown on the display of information terminal 30.

In contrast, when the RMS value is less than the predetermined threshold, error signal source 53 is not considered to properly detect the test sound outputted from loudspeaker 52. Therefore, when anomaly determiner 19 determines that the RMS value is less than the predetermined threshold (No in S53), anomaly determiner 19 notifies information terminal 30 that error signal source 53 has an anomaly (S55). As a result, an image showing that error signal source 53 has anomaly is shown on the display of information terminal 30.

As described above, active noise reduction device 10 can determine whether error signal source 53 has an anomaly using loudspeaker 52 that outputs a test sound to determine whether reference signal source 51 has an anomaly.

Note that it is not necessary to calculate the RMS value in example 3 of the anomaly determination operation. For example, a time average value of the signal levels of the error signal may be calculated instead of the RMS value.

Effects, Etc

As described above, active noise reduction device 10 includes: reference signal input terminal 11 that receives a reference signal outputted by reference signal source 51 and having a correlation with noise N0 in space 55 in automobile 50, the reference signal source being attached to automobile 50; test signal source 18 that outputs a test signal to loudspeaker 52 attached to automobile 50, loudspeaker 52 being used to output canceling sound N1 for reducing noise N0; and anomaly determiner 19 that determines whether reference signal source 51 has an anomaly, based on the reference signal inputted from reference signal source 51 to reference signal input terminal 11 when the test signal is outputted to loudspeaker 52. Automobile 50 is an example of a vehicle and reference signal input terminal 11 is an example of a reference signal input.

Such active noise reduction device 10 can determine whether reference signal source 51 has an anomaly using vibration of loudspeaker 52 that is based on the test signal. Active noise reduction device 10 can determine whether reference signal source 51 has an attachment problem, for example.

Moreover, for example, anomaly determiner 19 compares, with a predetermined threshold, a signal level of the reference signal inputted from reference signal source 51 to reference signal input terminal 11 when the test signal is outputted to loudspeaker 52 to determine whether reference signal source 51 has an anomaly.

Such active noise reduction device 10 can determine whether reference signal source 51 has an anomaly based on the signal level of the reference signal.

Moreover, for example, when the signal level is less than the predetermined threshold, anomaly determiner 19 determines that reference signal source 51 has an anomaly.

Such active noise reduction device 10 can detect that reference signal source 51 is not properly fixed to automobile main body 54, based on the signal level of the reference signal.

Moreover, for example, when the signal level is greater than the predetermined threshold, anomaly determiner 19 determines that reference signal source 51 has an anomaly.

Such active noise reduction device 10 can detect that reference signal source 51 is not properly fixed to automobile main body 54, based on the signal level of the reference signal.

Moreover, for example, the predetermined threshold includes an upper limit and a lower limit. Anomaly determiner 19 determines that reference signal source 51 has an anomaly in each of a case where the signal level is greater than the upper limit and a case where the signal level is less than the lower limit, and determines that reference signal source 51 does not have an anomaly when the signal level is greater than or equal to the lower limit and less than or equal to the upper limit.

Such active noise reduction device 10 can detect that reference signal source 51 is not properly fixed to automobile main body 54, based on the signal level of the reference signal.

Moreover, for example, anomaly determiner 19 converts, into a signal in a frequency domain, the reference signal inputted from reference signal source 51 to reference signal input terminal 11 when the test signal is outputted to loudspeaker 52 and compares, with a predetermined threshold, a power of the signal in the frequency domain to determine whether reference signal source 51 has an anomaly.

Such active noise reduction device 10 can determine whether reference signal source 51 has an anomaly, based on the power of the frequency components of the reference signal.

Moreover, for example, when the power is less than the predetermined threshold, anomaly determiner 19 determines that reference signal source 51 has an anomaly.

Such active noise reduction device 10 can detect that reference signal source 51 is not properly fixed to automobile main body 54, based on the power of the frequency components included in the reference signal.

Moreover, for example, when the power is greater than the predetermined threshold, anomaly determiner 19 determines that reference signal source 51 has an anomaly.

Such active noise reduction device 10 can detect that reference signal source 51 is not properly fixed to automobile main body 54, based on the power of the frequency components of the reference signal.

Moreover, for example, the predetermined threshold includes an upper limit and a lower limit. Anomaly determiner 19 determines that reference signal source 51 has an anomaly in each of a case where the power is greater than the upper limit and a case where the power is less than the lower limit; and determines that reference signal source 51 does not have an anomaly when the power is greater than or equal to the lower limit and less than or equal to the upper limit.

Such active noise reduction device 10 can detect that reference signal source 51 is not properly fixed to automobile main body 54, based on the power of the frequency components of the reference signal.

Moreover, for example, test signal source 18 outputs a sine wave as a test signal to loudspeaker 52.

Such active noise reduction device 10 can determine whether reference signal source 51 has an anomaly using vibration of loudspeaker 52 that is based on the sine wave.

Moreover, for example, test signal source 18 outputs, to loudspeaker 52, as the test signal, a signal obtained by synthesizing a plurality of sine waves having mutually different frequencies.

Such active noise reduction device 10 can determine whether reference signal source 51 has an anomaly by determining whether each of the plurality of frequency components of the reference signal satisfies the requirement.

Moreover, for example, whether reference signal source 51 has an anomaly is determined when automobile 50 is stationary.

Such active noise reduction device 10 can appropriately determine whether reference signal source 51 has an anomaly.

Moreover, for example, active noise reduction device 10 further includes error signal input terminal 13 that receives an error signal that is based on a residual sound from error signal source 53 for detecting the residual sound, the residual sound resulting from interference between canceling sound N1 and noise N0. Anomaly determiner 19 further determines whether error signal source 53 has an anomaly, based on the error signal inputted from error signal source 53 to error signal input terminal 13 when the test signal is outputted to loudspeaker 52. Error signal input terminal 13 is an example of an error signal input.

Such active noise reduction device 10 can determine whether error signal source 53 has an anomaly using output of a sound from loudspeaker 52 based on the test signal.

Moreover, for example, active noise reduction device 10 further includes: adaptive filter unit 15 that applies an adaptive filter to the reference signal received by reference signal input terminal 11 to generate a canceling signal to be used to output canceling sound N1; simulated acoustic transfer characteristics filter unit 16 that generates a filtered reference signal by correcting, using simulated acoustic transfer characteristics, the reference signal received by reference signal input terminal 11, the simulated acoustic transfer characteristics simulating acoustic transfer characteristics from a position of loudspeaker 52 to a position of error signal source 53; and filter coefficient updater 17 that updates a coefficient of the adaptive filter using the error signal inputted to error signal source 53 and the filtered reference signal generated.

Such active noise reduction device 10 can adaptively reduce noise N0.

Moreover, an anomaly determination method executed by a computer, such as active noise reduction device 10, includes: outputting a test signal to loudspeaker 52 attached to automobile 50, loudspeaker 52 being used to output canceling sound N1 for reducing noise N0 in a space in automobile 50; and determining whether reference signal source 51 attached to automobile 50 has an anomaly, based on a reference signal obtained from reference signal source 51 and having a correlation with noise N0 when the test signal is outputted to loudspeaker 52. Note that part or all of the anomaly determination method may be performed by information terminal 30.

Such an active noise reduction method can determine whether reference signal source 51 has an anomaly using vibration of loudspeaker 52 that is based on the test signal. The anomaly determination method can determine whether there is a problem in attachment of reference signal source 51, for example.

Other Embodiments

An embodiment has been described above, but the present disclosure is not limited to the embodiments described above.

For example, the anomaly determination operation in the above embodiment is performed when the vehicle is stationary so that the reference signal source will not detect vibration other than vibration of the loudspeaker. Here, the active noise reduction device may be configured to not output a test signal when the vehicle is not stationary. For example, an active noise reduction device may include an obtainer (for example, a terminal) that obtains information indicating a movement state of an automobile from the automobile, such as an automobile speed pulse, and the anomaly determiner may cause the test signal source to output a test signal only when the automobile is determined to be stationary based on the obtained information.

Moreover, the noise mainly targeted by the active noise reduction device according to the embodiment is road noise, but may be other noise, such as structure-borne noise or airborne noise. The types and bands of noise mainly targeted by the active noise reduction device are not particularly limited.

Moreover, the active noise reduction devices according to the embodiment described above may be mounted on a vehicle other than an automobile. For example, a vehicle may be an aircraft or a ship. Moreover, the present disclosure may be implemented as such a vehicle other than an automobile.

Moreover, the configurations of the active noise reduction device according to the embodiment described above are examples. For example, the active noise reduction device may include a structural element such as a digital-analog (D/A) converter, a filter, a power amplifier, or an analog-digital (A/D) converter.

Moreover, the processing operations performed by the active noise reduction device according to the embodiment described above are examples. For example, part of the digital signal processing operations described in the above embodiment may be implemented by analog signal processing.

Moreover, for example, in the embodiment described above, the processing performed by a particular processor may be performed by a different processor. Moreover, the order of a plurality of processing operations may be changed, and a plurality of processing operations may be performed in parallel.

Moreover, in the embodiment described above, each structural element may include dedicated hardware, or implemented by executing an appropriate software program for the structural element. Each structural element may be implemented by a program execution unit, such as a CPU or a processor, reading and executing a software program recorded on a recording medium such as a hard disk or semiconductor memory.

Moreover, in the embodiment described above, each structural element may be a circuit (or integrated circuit). These circuits may constitute one circuit as a whole, or each circuit may be a separate circuit. Each of these circuits may be a general-purpose circuit or a dedicated circuit.

Moreover, the general or specific aspects of the present disclosure may be implemented by a system, a device, a method, an integrated circuit, a computer program, or a non-transitory computer-readable recording medium, such as a CD-ROM. Moreover, the general or specific aspects of the present disclosure may be implemented as any combination of systems, devices, methods, integrated circuits, computer programs, and non-transitory computer-readable recording media.

For example, the present disclosure may be implemented as an anomaly determination method executed by an active noise reduction device (computer or DSP), or as a program for causing a computer or a DSP to execute the above anomaly determination method. Moreover, the present disclosure may be implemented as a vehicle (for example, an automobile) including the active noise reduction device according to the embodiment described above and a reference signal source. Moreover, the present disclosure may be implemented as a noise reduction system.

Other embodiments implemented through various changes and modifications conceived by a person of ordinary skill in the art based on the above embodiments or through a combination of the structural elements in the above embodiment in any manner that does not depart from the scope of the present disclosure may be included in the scope in an aspect or aspects according to the present disclosure.

While an embodiment has been described herein above, it is to be appreciated that various changes in form and detail may be made without departing from the spirit and scope of the present disclosure as presently or hereafter claimed.

Further Information About Technical Background to This Application

The disclosures of the following patent applications including specification, drawings and claims are incorporated herein by reference in theft entirety: Japanese Patent Application No. 2019-217059 filed on Nov. 29, 2019, and PCT International Application No. PCT/JP2020/043152 filed on Nov. 19, 2020.

INDUSTRIAL APPLICABILITY

The active noise reduction device according to the present disclosure is useful as a device capable of reducing noise in an automobile cabin and detecting an anomaly in a reference signal source, for example.

The invention claimed is:

1. An active noise reduction device, comprising:
a reference signal input that receives a reference signal, the reference signal being received from a reference signal source and having a correlation with noise in a space in a vehicle, the reference signal source being attached to the vehicle, the reference signal source including an acceleration sensor and a microphone;
a test signal source that outputs a test signal to a loudspeaker attached to the vehicle, the loudspeaker being used to output a canceling sound for reducing the noise; and
an anomaly determiner that determines whether the reference signal source includes an anomaly, based on the reference signal received by the reference signal input from the reference signal source when the test signal is outputted to the loudspeaker,
wherein the noise includes a road noise generated when the vehicle moves on the road, and
the anomaly determiner determines whether the reference signal source includes the anomaly, when the test signal is outputted to the loudspeaker, in an attachment of the reference signal source to the vehicle.

2. The active noise reduction device according to claim 1,
wherein the anomaly determiner compares, with a predetermined threshold, a signal level of the reference signal received by the reference signal input from the reference signal source when the test signal is outputted to the loudspeaker to determine whether the reference signal source includes the anomaly.

3. The active noise reduction device according to claim 2,
wherein, when the signal level is less than the predetermined threshold, the anomaly determiner determines that the reference signal source includes the anomaly.

4. The active noise reduction device according to claim 2,
wherein when the signal level is greater than the predetermined threshold, the anomaly determiner determines that the reference signal source includes the anomaly.

5. The active noise reduction device according to claim 2,
wherein the predetermined threshold includes an upper limit and a lower limit, and the anomaly determiner:
determines that the reference signal source includes the anomaly in each of a first case where the signal level is greater than the upper limit and a second case where the signal level is less than the lower limit; and
determines that the reference signal source does not include the anomaly when the signal level is greater than or equal to the lower limit and less than or equal to the upper limit.

6. The active noise reduction device according to claim 1, wherein the anomaly determiner converts, into a signal in a frequency domain, the reference signal received by the reference signal input from the reference signal source when the test signal is outputted to the loudspeaker, and compares, with a predetermined threshold, a power of the signal in the frequency domain to determine whether the reference signal source includes the anomaly.

7. The active noise reduction device according to claim 6, wherein, when the power is less than the predetermined threshold, the anomaly determiner determines that the reference signal source includes the anomaly.

8. The active noise reduction device according to claim 6, wherein when the power is greater than the predetermined threshold, the anomaly determiner determines that the reference signal source includes the anomaly.

9. The active noise reduction device according to claim 6, wherein the predetermined threshold includes an upper limit and a lower limit, and the anomaly determiner:

determines that the reference signal source includes the anomaly in each of a first case where the power is greater than the upper limit and a second case where the power is less than the lower limit; and determines that the reference signal source does not include the anomaly when the power is greater than or equal to the lower limit and less than or equal to the upper limit.

10. The active noise reduction device according to claim 1, wherein the test signal source outputs a sine wave as the test signal to the loudspeaker.

11. The active noise reduction device according to claim 1, wherein the test signal source outputs, to the loudspeaker, as the test signal, a signal obtained by synthesizing a plurality of sine waves having mutually different frequencies.

12. The active noise reduction device according to claim 1, wherein whether the reference signal source includes the anomaly is determined when the vehicle is stationary.

13. The active noise reduction device according to claim 1, further comprising:

an error signal input that receives an error signal that is based on a residual sound from an error signal source for detecting the residual sound, the residual sound resulting from interference between the canceling sound and the noise, wherein the anomaly determiner further determines whether the error signal source includes the anomaly, based on the error signal received by the error signal input from the error signal source when the test signal is outputted to the loudspeaker.

14. The active noise reduction device according to claim 13, further comprising:

an adaptive filter that is applied to the reference signal received by the reference signal input to generate a canceling signal to be used to output the canceling sound; and simulated acoustic transfer characteristics that are used to correct the reference signal received by the reference signal input to generate a filtered reference signal the simulated acoustic transfer characteristics simulating acoustic transfer characteristics from a position of the loudspeaker to a position of the error signal source, wherein a coefficient of the adaptive filter is updated using the error signal and the filtered reference signal.

15. A vehicle comprising:

the active noise reduction device according to claim 1; and the reference signal source.

16. The active noise reduction device according to claim 1, wherein the anomaly in the attachment of the reference signal source to the vehicle, which is determined by the anomaly determiner when the test signal is outputted to the loudspeaker, includes an attachment of the acceleration sensor to the vehicle.

17. The active noise reduction device according to claim 16, wherein the acceleration sensor is attached to a wheel housing or a knuckle of the vehicle.

18. The active noise reduction device according to claim 1, wherein an output of the reference signal source changes due to vibration of the reference signal source, and when the test signal is outputted to the loudspeaker, the loudspeaker vibrates and transfers such vibration to the reference signal source, whereby the vibration is anomalously transferred to the reference signal source when the reference signal source is not properly attached to the vehicle.

19. The active noise reduction device according to claim 18, wherein the test signal is a sine wave including a specific frequency from 30 Hz to 300 Hz.

20. An anomaly determination method to be executed by a computer, the anomaly determination method comprising:

outputting a test signal to a loudspeaker, the loudspeaker being attached to a vehicle, the loudspeaker being used to output a canceling sound for reducing noise in a space in the vehicle; and determining whether a reference signal source attached to the vehicle includes an anomaly, based on a reference signal obtained from the reference signal source and having a correlation with the noise when the test signal is outputted to the loudspeaker, wherein the reference signal source includes an acceleration sensor and a microphone, the noise includes a road noise generated when the vehicle moves on the road, and in the determining, the computer determines whether the reference signal source includes the anomaly, when the test signal is outputted to the loudspeaker, in an attachment of the reference signal source to the vehicle.

* * * * *